United States Patent Office 3,157,529
Patented Nov. 17, 1964

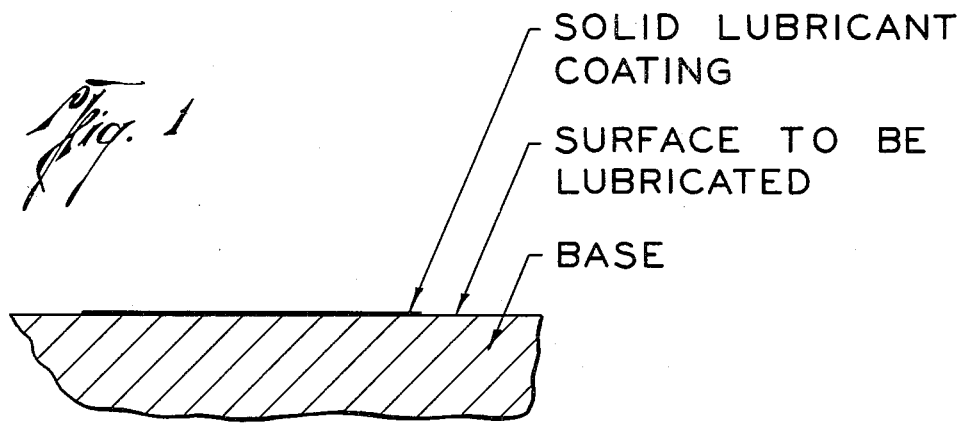
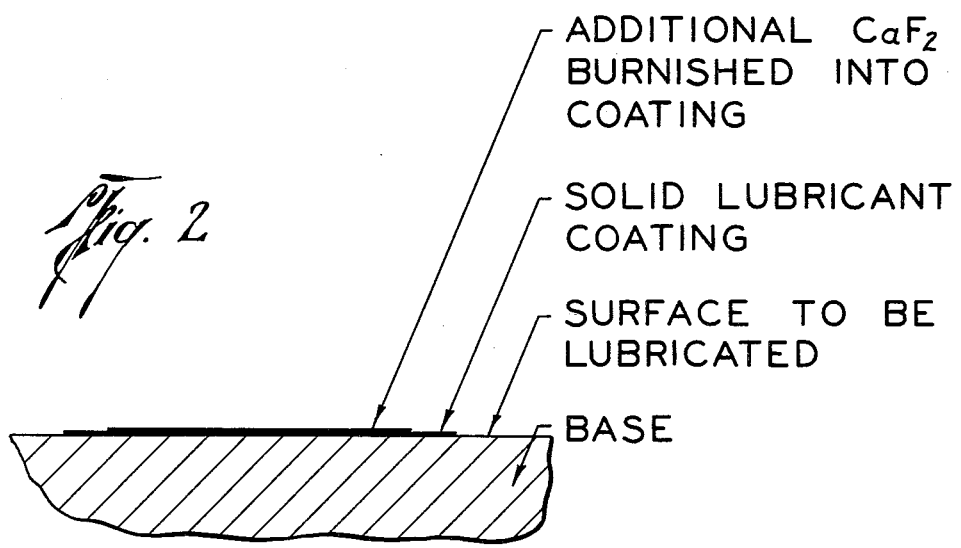

3,157,529
BONDED SOLID LUBRICANT COATING
Harold E. Sliney, Maple Heights, Ohio, assignor to the United States of America as represented by the Administrator of the National Aeronautics and Space Administration
Filed Oct. 13, 1961, Ser. No. 145,007
27 Claims. (Cl. 117—69)
(Granted under Title 35, U.S. Code (1952), sec. 266)

The invention described herein may be manufactured and used by or for the Government of the United States of America for governmental purposes without the payment of any royalties thereon or therefor.

This invention relates to the lubrication of sliding surfaces which are subject in use to mechanical friction at very high temperatures and at pressures varying from atmospheric to a hard vacuum. More specifically, the invention is concerned with lubricants of the solid film type, permanently applied as a film to the surface to be lubricated. This type of lubrication is especially suited for use in re-entry vehicles, i.e., vehicles which are designed to re-enter the earth's atmosphere at high velocity from some point in outer space.

Vehicles which are designed to be launched into outer space, and then recovered after re-entering the earth's atmosphere, are subjected to temperatures up to 1500° F. and above. At low altitudes (high oxygen partial pressure), oxidative stability is necessary; at high altitudes (low oxygen partial pressure), vaporization rates become important. These conditions place rather extreme requirements on moving parts within the re-entry vehicle, and a major problem has been in the reduction of friction. A present design trend is to circumvent the high-temperature lubrication problem by cooling the bearing surfaces, or locating them at a distance from heat sources. Considerable simplification of components and savings in space and weight would be derived by eliminating auxiliary cooling and by locating bearings as close to heat sources as an optimum mechanical design would dictate. In many applications this could be accomplished if a bonded solid lubricant with good thermal stability at temperatures of 1500° F. and higher were used.

Accordingly, it is an object of this invention to provide a bonded solid film lubricant which has good lubrication qualities. It is another object of this invention to provide a bonded solid film lubricant which will maintain these qualities under conditions of extreme heat and varying oxygen partial pressures. Other objects of the invention will appear as the description of invention proceeds.

According to one aspect of the invention, the foregoing and other objects are attained by providing a lubricant coating composition comprising calcium fluoride, $CaF_2$, and a binder therefor.

According to another aspect of the invention, a lubricant coated article is provided comprising a base having bonded thereto a lubricant coating composition, the latter being comprised of $CaF_2$ and a binder. Other aspects of the invention will appear in the more detailed description of the invention which follows, and by reference to the accompanying drawing.

FIG. 1 shows a cross-sectional view of a base having a solid lubricant coating applied to the surface thereof.

FIG. 2 shows a cross-sectional view of a base having a solid lubricant coating applied to the surface thereof, with additional $CaF_2$ burnished into the coating.

THE BASE

The base selected will depend upon the function of the part to be lubricated. For re-entry vehicles metals, alloys, and ceramics are well suited for mechanical parts in sliding contact. Other bases may also be used such as refractories and sintered compositions. Of particular interest in outer space applications are nickel-chrome alloys such as those set forth in Table 1 below.

Table I

| Alloy | Chemical Composition, Weight Percent | | | | | | | | | | | |
|---|---|---|---|---|---|---|---|---|---|---|---|---|
| | Ni | Co | Cr | Fe | C | Si | Mo | Al | Mn | Cu | Nb | Ti |
| Cast Inconel | Balance | | 13.5 | 6 | 0.2 | 2 | | | 0.8 | 0.25 | | |
| Inconel X | Balance | | 15 | 7 | 0.4 | 0.4 | | 0.7 | 0.5 | 0.2 | 1 | 2.5 |
| HS-21 | 1.5–3.5 | Balance | 25–30 | 2.0 | 0.3 | | 4.5–6.5 | | | | | |
| René 41 | 54 | 11 | 19 | | | | 10 | 1.5 | | | | 3 |

THE BINDER

The main requirements for the binder are (1) that it be compatible with calcium fluoride, (2) that it be bondable to the base surface to be coated, (3) that it have a coefficient of thermal expansion within about 10% of that of the base to which it is to be applied, and (4) that it have a melting point above the operating temperature of the sliding surfaces, but below the melting point of the base. As will be obvious to those skilled in the art, any of a number of well known binders may be selected which will meet the above requirements. For example, U.S. Patent No. 2,843,507, issued to John V. Long on July 15, 1958, and U.S. Patent No. 2,901,380, issued to Ralph E. Crump on August 25, 1959, show examples of ceramic binders from which a suitable binder may be selected. A number of ceramic compositions suitable as binders are also set forth in the article by Levin et al., entitled "Phase Diagram for Ceramists," the American Ceramic Society, Inc., 1956. As will also be obvious to those skilled in the art, these compositions may be adjusted so that their coefficient of thermal expansion will correspond to that of the base to which it is to be applied. See for example the book by Andrews entitled Enamels, published in 1935 by the Twin City Printing Company, Champaign, Illinois.

To illustrate, the following are examples of binder compositions which may be used, all figures being expressed as percent by weight:

| | Suitable Range | Preferred Range | Most Preferred |
|---|---|---|---|
| CoO | 40–70 | 55–65 | 60 |
| BaO | 10–30 | 15–25 | 20 |
| $B_2O_3$ | 10–30 | 17–23 | 20 |

| | Preferred Range | Most Preferred |
|---|---|---|
| BaO | 20–65 | 61 |
| NiO | 15–65 | 18 |
| $B_2O_3$ | 15–25 | 18 |
| CoO | 0–3 | 3 |
| BaO | 40–60 | 55 |
| $SiO_2$ | 15–30 | 22 |
| $Al_2O_3$ | 0–12 | 10.5 |
| NaF | 0–15 | 9.5 |
| $MoO_3$ | 0–5 | 3 |

The ratio of $CaF_2$ to binder can vary within wide limits. Useful coating compositions may be prepared having from 10 to 80 percent binder, 50 percent being a preferred upper limit. However, from 15 to 35 percent binder has been found to be a preferred range, with about 25 percent binder being the most preferred.

APPLICATION OF COATING

The coating composition may be applied by any of a number of techniques. The coating composition may be ground to a fine powder, added to water, and vigorously stirred to form a slurry. The water slurry can then be applied by spraying, brushing, dipping, or any other suitable manner. A suspension agent may be included in the slurry, but in most instances this is not necessary. The thickness of the coatings is preferably held to between 0.0008 and 0.0035 inch, with from 0.001 to 0.002 inch being the most preferred range.

In the absence of a suspension agent, it is desirable to maintain the base at a temperature of about 300° F. to 500° F. during application of the coating. In this manner the water of the slurry evaporates on contact with the base, thus preventing undesirable running of deposit on the base.

After the coating has thoroughly dried the article is fired at a high temperature to fuse the coating to the base, and to bind the fluoride particles to each other. The firing temperature should be below the melting point of the base, but above the softening point of the coating. It has been found that around 2000° F. is satisfactory in most cases. Upon removal from the furnace, the coated article may be brought to room temperature on a water-cooled steel block. The finished article just described is illustrated in FIG. 1.

The invention will now be further described by means of specific examples of exemplary embodiments of the invention.

EXAMPLE 1

Reagent grade powders of cobalt oxide, CoO, barium oxide, BaO, and boric acid, $H_3BO_3$, were mixed in proportions to produce, after firing, the following composition:

| | Percent |
|---|---|
| CoO | 60 |
| BaO | 20 |
| $B_2O_3$ | 20 |

The mixture was then melted in large crucibles until a quiescent, uniform melt was obtained. The melt was slowly poured into cold water to form friable shot-like globules, which were filtered, dried, and finally ball-milled to pass a 200-mesh screen.

To one part by weight of the above composition was added three parts by weight of calcium fluoride, $CaF_2$. One hundred grams of the resulting mixture were suspended in about 750 milliliters of water and violently stirred into a slurry by a high-speed blender. No suspending agents were used, but the solids remained in suspension long enough to be sprayed.

Metal discs of Inconel X were preheated to 500° F. immediately before spraying. Upon spraying, the water evaporated from the hot metal, and a thin film of ceramic powder remained. The coating was built up by repeated passes with the spray gun to a thickness of between 0.001 and 0.002 inch.

After spraying, the discs were fired at 2000° F. to fuse the ceramic to the base metal. Upon removal from the furnace the specimens were brought to room temperature on a water-cooled steel block. Upon cooling the ceramic solidified and acted to bind the fluoride particles to each other and to the metal base.

EXAMPLES 2, 3, 4, and 5

The procedure of Example 1 is followed in each case, but the ratio of binder to $CaF_2$ is varied according to the following schedule.

Example 2: 1 part binder to 9 parts $CaF_2$.
Example 3: 1 part binder to 4 parts $CaF_2$.
Example 4: 1 part binder to 1 part $CaF_2$.
Example 5: 4 parts binder to 1 part $CaF_2$.

The specimens prepared in Examples 1, 2, 3, 4, and 5 were tested to determine their friction coefficient and their endurance life. A detailed description of the apparatus used in performing the tests may be found in the publication by Harold E. Sliney, entitled "Effect of Sliding Velocity on Friction Properties and Endurance Life of Bonded Lead Monoxide Coatings at Temperatures up to 1250° F.," NACA RM E58B11, 1958. Basically, a rotating disc is placed in sliding contact with a hemispherically-tipped rider (3/16-in.-rad. hemisphere) under a normal load of 1 kilogram. The rider describes a 2-inch-diameter wear track on the disc. Sliding is unidirectional and at a velocity of 430 feet per minute. Friction torque is measured with strain gages and continuously recorded. All specimens were "run-in" with incrementally increased loads according to the following procedure: 2 minutes at 200 grams, 2 minutes at 400 grams, 2 minutes at 600 grams, 2 minutes at 800 grams, and finally, 1000 grams for the remainder of the test.

Before each test the rider and disc specimens were cleaned according to the following procedure:
(1) Wash with acetone.
(2) Scrub with levigated alumina (omitted when cleaning discs to avoid imbedding alumina particles into coatings).
(3) Rinse with hot tape water.
(4) Rinse briefly with distilled water.
(5) Blot dry with filter paper.
(6) Store in desiccator.

The test results of Examples 1–5 are summarized in Tables 2 and 3 below.

Table 2.—*Effect of Ceramic Content on Coefficient of Friction (Examples 1–5)*

| Example | 500° F. | 1,000° F. | 1,200° F. | 1,500° F. |
|---|---|---|---|---|
| 1 | 0.22 | 0.12 | 0.11 | 0.15 |
| 2 | | 0.16 | 0.08 | 0.10 |
| 3 | 0.30 | 0.18 | 0.07 | 0.08 |
| 4 | 0.30 | 0.16 | 0.35 | 0.20 |
| 5 | 0.49 | | 9.37 | 0.15 |

Table 3.—*Effect of Ceramic Content on Endurance Life (In number of cycles before failure) (Examples 1–5)*

| Example | 500° F. | 1,000° F. | 1,200° F. | 1,500° F. |
|---|---|---|---|---|
| 1 | (¹) | (¹) | (¹) | 29,000 |
| 2 | | 14,000 | 38,000 | 17,000 |
| 3 | 2,000 | 21,000 | 19,000 | 17,000 |
| 4 | 24,000 | (¹) | 25,000 | 28,000 |
| 5 | 3,000 | | 3,000 | 43,000 |

¹ No failure after 50,000 cycles.

EXAMPLES 6, 7, 8, 9, AND 10

The procedure of Example 1 is followed, utilizing a binder of the following composition:

| | Percent |
|---|---|
| BaO | 61 |
| NiO | 18 |
| $B_2O_3$ | 18 |
| CoO | 3 |

The ratio of binder to $CaF_2$ is varied according to the following schedule.

Example 6: 1 part binder to 9 parts $CaF_2$.
Example 7: 1 part binder to 4 parts $CaF_2$.
Example 8: 1 part binder to 3 parts $CaF_2$.
Example 9: 1 part binder to 1 part $CaF_2$.
Example 10: 4 parts binder to 1 part $CaF_2$.

EXAMPLES 11, 12, 13, 14, AND 15

The procedure of Example 1 is followed, utilizing a binder of the following composition:

| | Percent |
|---|---|
| BaO | 55 |
| $SiO_2$ | 22 |
| $Al_2O_3$ | 10.5 |
| NaF | 9.5 |
| $MoO_3$ | 3 |

The ratio of binder is varied according to the following schedule.

Example 11: 1 part binder to 9 parts $CaF_2$.
Example 12: 1 part binder to 4 parts $CaF_2$.
Example 13: 1 part binder to 3 parts $CaF_2$.
Example 14: 1 part binder to 1 part $CaF_2$.
Example 15: 4 parts binder to 1 part $CaF_2$.

$CaF_2$, which melts at 2430° F., has no inherent property which should limit its usefulness as a solid lubricant to 1500° F. Rather, the temperature limitation is imposed by the melting point of the binder and the temperature at which the base loses its mechanical strength. By a careful selection of binder and base, it is possible to approach about 2300° F. as the limit of operability.

METHODS OF IMPROVING QUALITY OF THE ABOVE EXAMPLES

The product of each of the above examples may be improved in three different ways. One way is to cool the product more slowly after removal from the furnace. This may be done by substituting a refractory block for the water-cooled steel block. Another way is to pre-oxidize the metal base before applying the coating. This may be done by heating the metal base at about 2000° F. until a deep blue oxide layer is formed. This tenacious layer improves adhesion of the coating to the metal base.

The third method of improving the products of the above examples is by applying a $CaF_2$ overlay onto the coatings. This may be done by spraying a very thin film of $CaF_2$ on the coating with an airbrush. The article is baked at about 1700° F. for around 4 minutes to sinter the $CaF_2$ particles, followed by a second $CaF_2$ spraying and a 2½ minute bake at 1700° F. Finally, the overlay is burnished on a flannel-covered polishing wheel impregnated with dry $CaF_2$. It is believed that the beneficial effect of this procedure is derived from the filling of the microscopic pores in the ceramic coating, thus adding to its strength. The overall thickness of the coating is not affected by this procedure. The finished article described in this embodiment is illustrated in FIG. 2.

Obviously, many modifications and variations of the present invention are possible in the light of the above teachings. It is, therefore, to be understood that within the scope of the appended claims the invention may be practiced other than as specifically described.

What is claimed is:

1. A lubricant coating composition comprising 75% $CaF_2$, and 25% of a ceramic binder therefor, said binder comprising 60% CoO, 20% BaO, and 20% $B_2O_3$, all percentages being expressed by weight.

2. A lubricant coated article comprising a metal base and a solid lubricant coating bonded thereto, said coating being the composition of claim 1.

3. The lubricant coated article of claim 2 having a thin layer of $CaF_2$ burnished into the coating composition.

4. A lubricant coating composition comprising from 85 to 65 percent $CaF_2$, and from 15 to 35 percent of a ceramic binder therefor, said binder comprising 60% CoO, 20% BaO, and 20% $B_2O_3$, all percentages being expressed by weight.

5. A lubricant coated article comprising a metal base and a solid lubricant coating bonded thereto, said coating being the composition of claim 4.

6. The lubricant coated article of claim 5 having a thin layer of $CaF_2$ burnished into the coating composition.

7. A lubricant coating composition comprising from 85 to 65 percent $CaF_2$, and from 15 to 35 percent of a ceramic binder therefor, said binder comprising from 40 to 70 percent CoO, from 10 to 30 percent BaO, and from 10 to 30 percent $B_2O_3$, all percentages being expressed by weight.

8. A lubricant coated article comprising a metal base and a solid lubricant coating bonded thereto, said coating being the composition of claim 5.

9. The lubricant coated article of claim 8 having a thin layer of $CaF_2$ burnished into the coating composition.

10. A lubricant coating composition comprising from 85 to 65 percent $CaF_2$, and from 15 to 35 percent of a ceramic binder therefor, said binder comprising from 55 to 65 percent CoO, from 15 to 25 percent BaO, and from 17 to 23 percent $B_2O_3$, all percentages being expressed by weight.

11. A lubricant coated article comprising a metal base and a solid lubricant coating bonded thereto, said coating being the composition of claim 10.

12. The lubricant coated article of claim 11 having a thin layer of $CaF_2$ burnished into the coating composition.

13. A lubricant coating composition comprising from 85 to 65 percent $CaF_2$, and from 15 to 35 percent of a ceramic binder therefor, said binder comprising 61% BaO, 18% NiO, 18% $B_2O_3$, and 3% CoO, all percentages being expressed by weight.

14. A lubricant coated article comprising a metal base and a solid lubricant coating bonded thereto, said coating being the composition of claim 13.

15. The lubricant coated article of claim 14 having a thin layer of $CaF_2$ burnished into the coating composition.

16. A lubricant coating composition comprising from 85 to 65 percent $CaF_2$, and from 15 to 35 percent of a ceramic binder therefor, said binder comprising from 20 to 65 percent BaO, 15 to 65 percent NiO, 15 to 25 percent $B_2O_3$, and from 0 to 3 percent CoO, all percentages being expressed by weight.

17. A lubricant coated article comprising a metal base and a solid lubricant coating bonded thereto, said coating being the composition of claim 16.

18. The lubricant coated article of claim 17 having a thin layer of $CaF_2$ burnished into the coating composition.

19. A lubricant coating composition comprising from 85 to 65 percent $CaF_2$, and from 15 to 35 percent of a ceramic binder therefor, said binder comprising 55% BaO, 22% $SiO_2$, 10.5% $Al_2O_3$, 9.5% NaF, and 3% $MoO_3$, all percentages being expressed by weight.

20. A lubricant coated article comprising a metal base and a solid lubricant coating bonded thereto, said coating being the composition of claim 19.

21. The lubricant coated article of claim 20 having a thin layer of $CaF_2$ burnished into the coating composition.

22. A lubricant coating composition comprising from 85 to 65 percent $CaF_2$, and from 15 to 35 percent of a ceramic binder therefor, said binder comprising from 40 to 60 percent BaO, from 15 to 30 percent $SiO_2$, from 0 to 12 percent $Al_2O_3$, from 0 to 15% NaF, and from 0 to 5% $MoO_3$, all percentages being expressed by weight.

23. A lubricant coated article comprising a metal base and a solid lubricant coating bonded thereto, said coating being the composition of claim 22.

24. The lubricant coated article of claim 23 having a thin layer of $CaF_2$ burnished into the coating composition.

25. A lubricant coating composition capable of repeated wear cycles at high temperatures and pressures from atmospheric to a hard vacuum comprising a major portion of $CaF_2$ and a minor portion of a ceramic binder therefor, said binder containing CoO, BaO, and $B_2O_3$.

26. A lubricant coated article comprising a base and a solid lubricant coating bonded thereto, said base comprising one of the members selected from the group consisting of metals, alloys, and ceramics, said coating being the composition of claim 25.

27. The lubricant coated article of claim 26 having a thin layer of $CaF_2$ burnished into the coating composition.

References Cited by the Examiner

UNITED STATES PATENTS

| | | | |
|---|---|---|---|
| 2,601,123 | 6/52 | Moulton | 117—124 |
| 2,806,801 | 9/57 | Leston | 117—129 X |
| 3,035,318 | 5/62 | Campbell | 117—127 X |

OTHER REFERENCES

Proceedings of the International Patent Office Workshop on Information Retrieval, U.S. Dept. of Commerce, p. 154, T 223 P264C.

RICHARD D. NEVIUS, *Primary Examiner.*